(12) United States Patent
Sabacky et al.

(10) Patent No.: US 7,713,504 B2
(45) Date of Patent: May 11, 2010

(54) METHOD FOR PRODUCING MIXED METAL OXIDES AND METAL OXIDE COMPOUNDS

(75) Inventors: Bruce J. Sabacky, Reno, NV (US); Timothy M. Spitler, Fernley, NV (US); Jan Prochazka, Reno, NV (US)

(73) Assignee: Altair Nanomaterials, Inc., Reno, NV (US)

( * ) Notice: Subject to any disclaimer, the term of this patent is extended or adjusted under 35 U.S.C. 154(b) by 1197 days.

(21) Appl. No.: 11/287,610

(22) Filed: Nov. 28, 2005

(65) Prior Publication Data

US 2006/0078727 A1    Apr. 13, 2006

Related U.S. Application Data

(63) Continuation of application No. 09/948,155, filed on Sep. 5, 2001, now Pat. No. 6,974,566.

(60) Provisional application No. 60/230,211, filed on Sep. 5, 2000.

(51) Int. Cl.
   *C01G 23/00*    (2006.01)

(52) U.S. Cl. .................. 423/263; 423/595; 423/596; 423/598; 423/594.8; 423/594.12; 423/594.13; 423/594.15; 423/594.16

(58) Field of Classification Search ................. 423/263, 423/595–598, 594.8, 594.12, 594.13, 594.15, 423/594.16; 502/302–304
   See application file for complete search history.

(56) References Cited

U.S. PATENT DOCUMENTS

| | | | |
|---|---|---|---|
| 4,009,124 A | 2/1977 | Laurer et al. |
| 4,591,575 A | 5/1986 | Okabayashi et al. |
| 4,649,037 A | 3/1987 | Marsh et al. |
| 4,704,266 A | 11/1987 | Kadokura et al. |
| 4,751,070 A | 6/1988 | Pai Verneker |
| 4,835,123 A | 5/1989 | Bush et al. |
| 4,863,521 A | 9/1989 | Block |
| 4,891,343 A | 1/1990 | Quadair |
| 4,913,961 A | 4/1990 | Jones et al. |
| 5,023,217 A | 6/1991 | Everhart et al. |
| 5,036,037 A | 7/1991 | Kladnig et al. |
| 5,114,702 A | 5/1992 | Pederson et al. |
| 5,338,353 A | 8/1994 | Uchino et al. |
| 5,340,604 A | 8/1994 | Atsushi |
| 5,447,898 A | 9/1995 | Blankenstein et al. |
| 5,505,865 A | 4/1996 | Kumar et al. |
| 5,545,468 A | 8/1996 | Koshiba et al. |
| 5,648,057 A | 7/1997 | Ueda et al. |
| 5,728,362 A | 3/1998 | Greuter et al. |
| 5,770,018 A | 6/1998 | Saidi |
| 5,800,934 A | 9/1998 | Qadri et al. |
| 5,807,531 A | 9/1998 | Hibst et al. |
| 5,846,505 A | 12/1998 | Saegusa |
| 5,976,489 A | 11/1999 | Saidi et al. |
| 6,030,914 A | 2/2000 | Matsui |
| 6,045,771 A | 4/2000 | Matsubara et al. |
| 6,060,422 A | 5/2000 | Takahashi et al. |
| 6,068,828 A | 5/2000 | Hata et al. |
| 6,087,285 A | 7/2000 | Oomichi et al. |
| 6,162,530 A | 12/2000 | Xiao et al. |
| 6,194,083 B1 | 2/2001 | Yasuda et al. |
| 6,325,988 B1 | 12/2001 | Inoue et al. |
| 6,383,235 B1 | 5/2002 | Maegawa et al. |
| 6,413,489 B1 | 7/2002 | Ying et al. |
| 6,482,387 B1 | 11/2002 | Gulgun et al. |
| 6,689,716 B2 | 2/2004 | Sabacky et al. |
| 6,869,584 B2 | 3/2005 | Ying et al. |
| 6,890,510 B2 | 5/2005 | Spitler |

FOREIGN PATENT DOCUMENTS

| | | |
|---|---|---|
| EP | 0 354 573 B1 | 2/1990 |
| EP | 0 646 974 A1 | 4/1995 |
| EP | 0 884 280 B1 | 12/1998 |
| EP | 0 949 220 A1 | 10/1999 |
| EP | 1 036 767 A1 | 9/2000 |
| JP | 63236713 A | 10/1988 |
| WO | WO 98/22387 A1 | 5/1998 |
| WO | 98-29915 * | 7/1998 |
| WO | WO 01/00530 A1 | 1/2001 |
| WO | WO 01/00531 A1 | 1/2001 |
| WO | WO 01/12555 A2 | 2/2001 |
| WO | WO 01/23321 A1 | 4/2001 |

\* cited by examiner

*Primary Examiner*—Steven Bos
(74) *Attorney, Agent, or Firm*—Brinks Hofer Gilson & Lione; G. Peter Nichols

(57) ABSTRACT

A process to produce mixed metal oxides and metal oxide compounds. The process includes evaporating a feed solution that contains at least two metal salts to form an intermediate. The evaporation is conducted at a temperature above the boiling point of the feed solution but below the temperature where there is significant crystal growth or below the calcination temperature of the intermediate. The intermediate is calcined, optionally in the presence of an oxidizing agent, to form the desired oxides. The calcined material can be milled and dispersed to yield individual particles of controllable size and narrow size distribution.

9 Claims, 11 Drawing Sheets

METHOD FOR PRODUCING MIXED METAL OXIDES AND METAL OXIDE COMPOUNDS

This application is a continuation of U.S. Ser. No. 09/948,155, filed Sept. 5, 2001, now U.S. Pat. No. 6,974,566, which claims priority to U.S. application Ser. No. 60/230,211, filed Sept. 5, 2000, the entire contents of each is incorporated herein by reference.

The present invention relates to a process for the manufacture of mixed metal oxides and metal oxide compounds from aqueous solutions of their salts, part of the process, and the product of the process.

BACKGROUND OF THE INVENTION

Oxides of copper and aluminum are used as catalyst precursors in the manufacture of butynediol-1,4 or other organic compounds. U.S. Pat. No. 4,009,124 teaches a method to make a basic mixed carbonate of copper and aluminum with a defined crystal structure, which, after annealing at 350° to 600° C., produces an amorphous phase, particularly active as a catalyst. The process involves milling and sifting of the annealed product to obtain a suitable particle distribution e.g. from 60 to 200 μm. Discrete forms suitable for use as fixed-bed catalysts are also used.

Novel processes for the manufacture of titanium dioxide from aqueous solutions have been disclosed in PCT Publications WO 01/00530, WO 01/00531, and WO 01/12555, the relevant portions of which are incorporated herein by reference. In general, these applications describe the processing of an aqueous solution of a titanium salt by evaporation to produce an intermediate. The evaporation is conducted at a temperature higher than the boiling point of the solution, but lower than the temperature where significant crystal growth of an oxide phase occurs. In some embodiments, the evaporation may be conducted at a temperature higher than the boiling point of the solution but lower than the calcination temperature of the intermediate.

In the case of titanium solutions, the temperature generally ranges from 120° to 350° C., and preferably from 200° to 250° C. The process is preferably conducted by spraying, and can be accomplished in a spray dryer. The spray drying process produces thin-filmed spheres or parts of spheres, with a diameter of about 1 to 100 μm, and a shell thickness of about 0.03 to 5 μm.

After calcination and milling of these spheres or parts of spheres, and depending on the conditions of evaporation, the choice of additives and the conditions of calcination, ultrafine nano-sized $TiO_2$ or, alternatively, pigment grade $TiO_2$ can be obtained.

There has been no suggestion, however, that such a process can economically and commercially produce mixed metal oxides and metal oxide compounds. The present invention is therefore directed to a process to economically produce intimate mixtures of oxides or compounds formed from a mixture of oxides, starting from aqueous solutions of salts of different metals.

SUMMARY OF THE INVENTION

The present invention provides a process for the manufacture of mixed metal oxides and metal oxide compounds that comprises preparing an aqueous feed solution that contains at least two metal salts, evaporating the feed solution under controlled conditions to form an intermediate, and calcining the intermediate to convert any remaining metal salts to metal oxides. In selected embodiments, the calcining is conducted in the presence of an oxidizing agent.

The metal salts are selected from the group consisting of alkali metals, Mg, alkaline earth metals, lanthanoids, Group 3-15 stable metals, and mixtures thereof. In particular, the metal salts are selected from the group consisting of Li, Na, K, Mg. Ca, Sr, Ba, Sc, Y, lanthanoids, Ti, Zr, Hf, V, Nb, Ta, Cr, Mo, W, Mn, Fe, Co, Ni, Cu, Zn, Cd, Al, In, Sn, Pb, Sb, Bi, and mixtures thereof.

In one embodiment, the feed solution contains a first metal salt that hydrolyzes at the temperature of evaporation and a second metal salt that is stable at the temperature of evaporation. In this embodiment, the first metal salt is selected from the group consisting of Ti, Zr, Hf, V, Nb, Ta, Cr, Mo, W, Mn, Al, Sn, Sb, Pb, Bi, and mixtures thereof. Likewise, the second metal salt is selected from the group consisting of Li, Na, K, Mg, Ca, Sr, Ba, Sc, Y, lanthanoids, Mn, Fe, Co, Ni, Cu, Zn, Cd, Al, In, Sn, Sb, Pb, Bi, and mixtures thereof. One of skill in the art will understand that the first metal salt and the second metal salt may hydrolyze or not, depending on the exact composition of the solution.

The anion involved in the formation of the metal salt can be any anion that can be made to form an aqueous solution of the salt. Non-limiting examples of suitable anions include chlorides, oxychlorides, sulfates, oxysulfates, nitrates, nitrites, chlorates, perchlorates, and organic anions such as acetates and citrates and mixtures thereof.

The evaporation is conducted under conditions to achieve substantially total evaporation and to form an intermediate. In particular, the evaporation is conducted at a temperature higher than the boiling point of the feed solution but lower than the temperature where significant crystal growth of an oxide phase occurs. The evaporation may be conducted at a temperature higher than the boiling point of the solution but lower than the calcination temperature of the intermediate. In a particularly preferred embodiment, the intermediate is an amorphous solid formed as a thin film and preferably is spherical or part of a sphere.

The term "substantially total evaporation" or "substantially complete evaporation" refers to evaporation of greater than 85% of the free water content, preferably greater than 90% of the free water and more preferably greater than 95% of the free water present in the feed solution. The term "free water" is understood and means water that is not chemically bound and can be removed by heating at a temperature below 150° C. After substantially total evaporation or substantially complete evaporation, the intermediate product will have no visible moisture present.

The intermediate is then calcined to convert the intermediate to a mixture of metal oxides or to a metal oxide compound. If non-oxidized salts are present in the intermediate, an oxidizing agent is preferably added during the calcination process to convert any remaining metal salts to the metal oxide products of the present invention.

In accordance with the process of the present invention a mixed metal oxide or a metal oxide compound is produced and is characterized by a crystallized metal oxide or mixed metal oxide phase such that at a magnification of 30,000× under a scanning electron microscope, the mixed metal oxide or metal oxide compound appears homogeneous.

The mixed metal oxide produced by the process according to the present invention may also be characterized by a uniform bound structure of individual particles having an average size between 10 and 50 nm and a standard deviation of no more than 20%.

DESCRIPTION OF THE DRAWINGS

FIG. 6 shows that the product of FIG. 5 is in the amorphous state.

DESCRIPTION OF THE INVENTION

Figure 1:
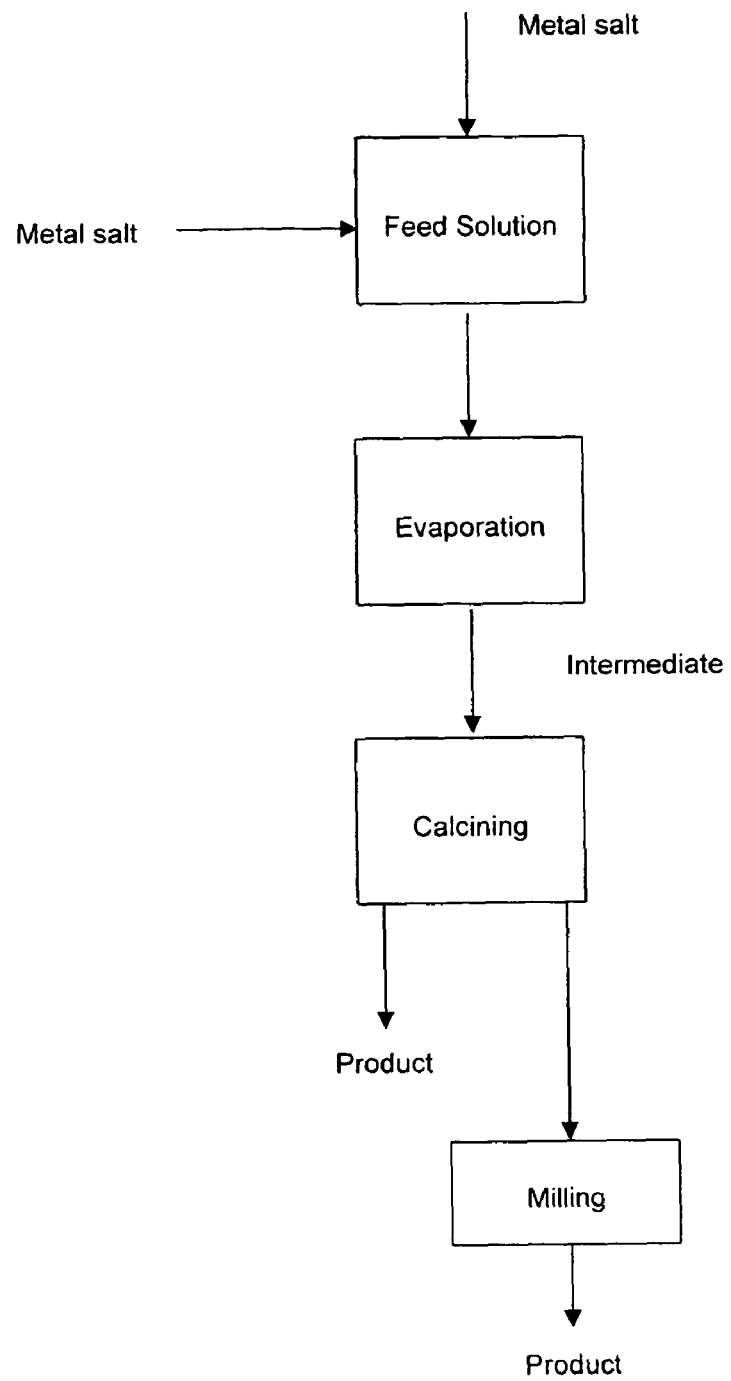
FIG. 1 is a general flow sheet showing the steps of one embodiment of the process of the present invention.
Figure 2:
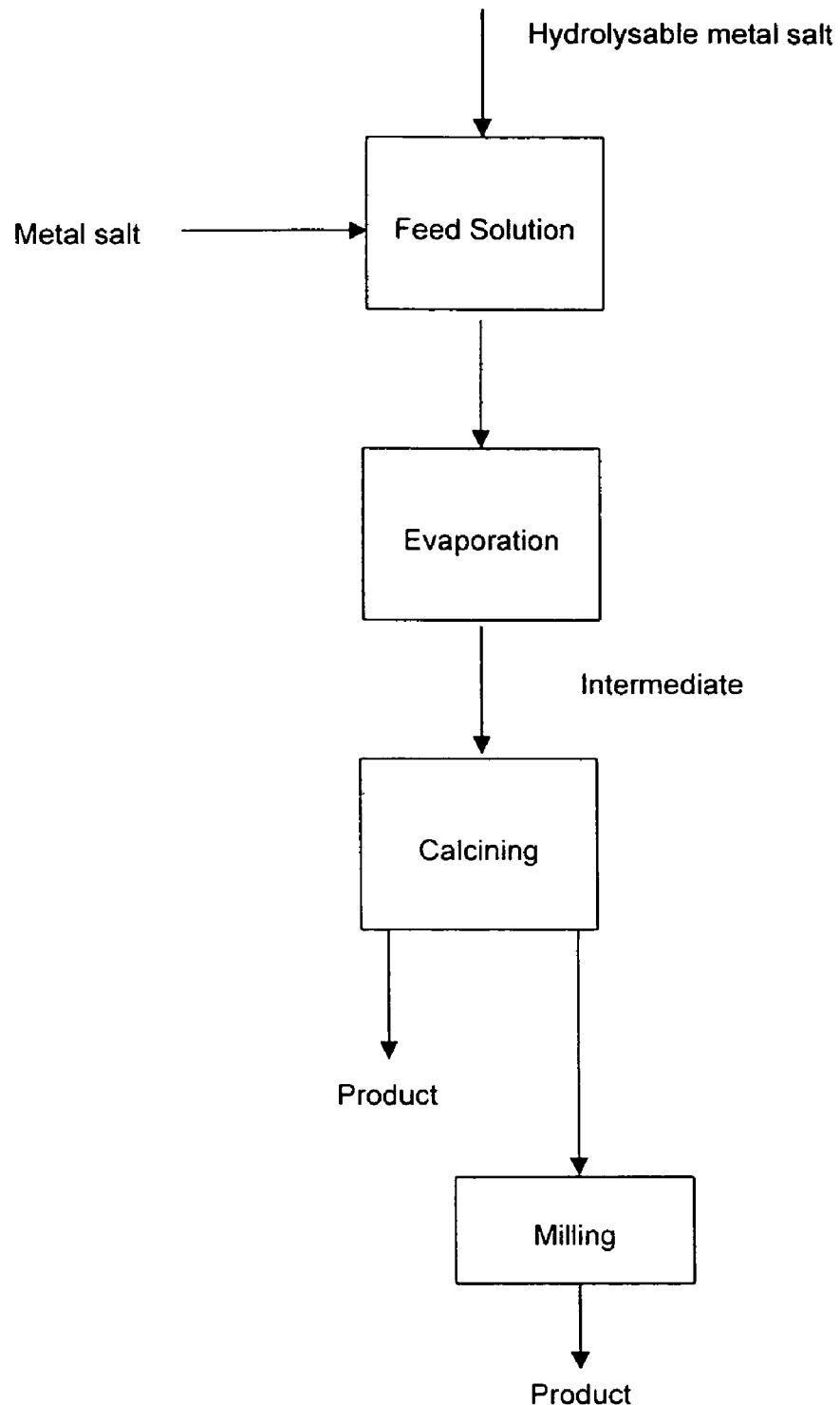
FIG. 2 is a flow sheet of another embodiment of the process of the present invention, where one of the feed materials is a hydrolysable salt.

Turning now to FIG. 1, a flow sheet of one embodiment according to the present invention is shown. According to this embodiment a feed solution of two or more salts is provided. Thereafter, the feed solution is evaporated to provide an intermediate, which is calcined to form a product that may be used "as is" or may optionally be further finished by, for example, milling.

The feed solution is generally an aqueous solution formed from two or more metal salts. The metal salts are selected from the group consisting of alkali metals, Mg, alkaline earth metals, lanthanoids, Group 3-15 stable metals, and mixtures thereof. In particular, the metal salts are selected from the group consisting of Li, Na, K, Mg. Ca, Sr, Ba, Sc, Y, lanthanoids, Ti, Zr, Hf, V, Nb, Ta, Cr, Mo, W, Mn, Fe, Co, Ni, Cu, Zn, Cd, Al, In, Sn, Pb, Sb, Bi, and mixtures thereof.

In one embodiment, the feed solution contains a first metal salt that hydrolyzes at the temperature of evaporation and a second metal salt that is stable at the temperature of evaporation. In this embodiment, the first metal salt is selected from the group consisting of Ti, Zr, Hf, V, Nb, Ta, Cr, Mo, W, Mn, Al, Sn, Sb, Pb, Bi, and mixtures thereof. Likewise, the second metal salt is selected from the group consisting of Li, Na, K, Mg, Ca, Sr, Ba, Sc, Y, lanthanoids (La, Ce, Pr, Nd, Pm, Sm, Eu, Gd, Tb, Dy, Ho, Er, Tm, Yb), Mn, Fe, Co, Ni, Cu, Zn, Cd, Al, In, Sn, Sb, Pb, Bi, and mixtures thereof. One of skill in the art will understand that the first metal salt and the second metal salt may hydrolyze or not, depending on the exact composition of the solution.

The anion involved in the formation of the metal salt can be any anion that can be made to form an aqueous solution of the salt. Non-limiting examples of suitable anions include chlorides, oxychlorides, sulfates, oxysulfates, nitrates, nitrites, chlorates, perchlorates, and organic anions such as acetates and citrates and mixtures thereof.

The concentration in the feed solution of each metal is in the range of 10 to 200 g/l and preferably in the range of 50 to 150 g/l.

The feed solution is evaporated under controlled temperature conditions to form an intermediate product comprising a thin film. The evaporation is conducted above the boiling point of the solution but below the temperature where there is significant crystal growth of an oxide phase. The evaporation is also conducted in a manner to control the physical form of the product. The evaporation may be conducted at a temperature higher than the boiling point of the solution but lower than the calcination temperature of the intermediate.

The product will generally be amorphous and retain chemically combined water as a hydrated oxide. Preferably, the evaporation is conducted under conditions to achieve substantially complete evaporation. Water and volatile products of the acid involved are vaporized and may be recovered by any known process. The process is particularly suited to the production of mixed metal oxides or metal oxide compounds where at least one of the oxides is formed by hydrolysis during the evaporation step.

The evaporation can be accomplished by contact of drops of solution with a hot surface or by spraying in a stream of hot gas. Preferably, the spraying is accomplished in a spray dryer. Through control of the operating parameters, including temperature, flow rate, and concentration of the metal salts, the resulting physical and chemical characteristics of the solid intermediate product can be controlled within a fairly narrow range. In general, the evaporation temperature is in the range of 100° to 600° C. and preferably in the range of 200° to 400° C. Accordingly, when a spray dryer is used, the temperature in the spraying chamber is in the range of 100° to 600° C. and preferably in the range of 200° to 400° C.

Figure 5:
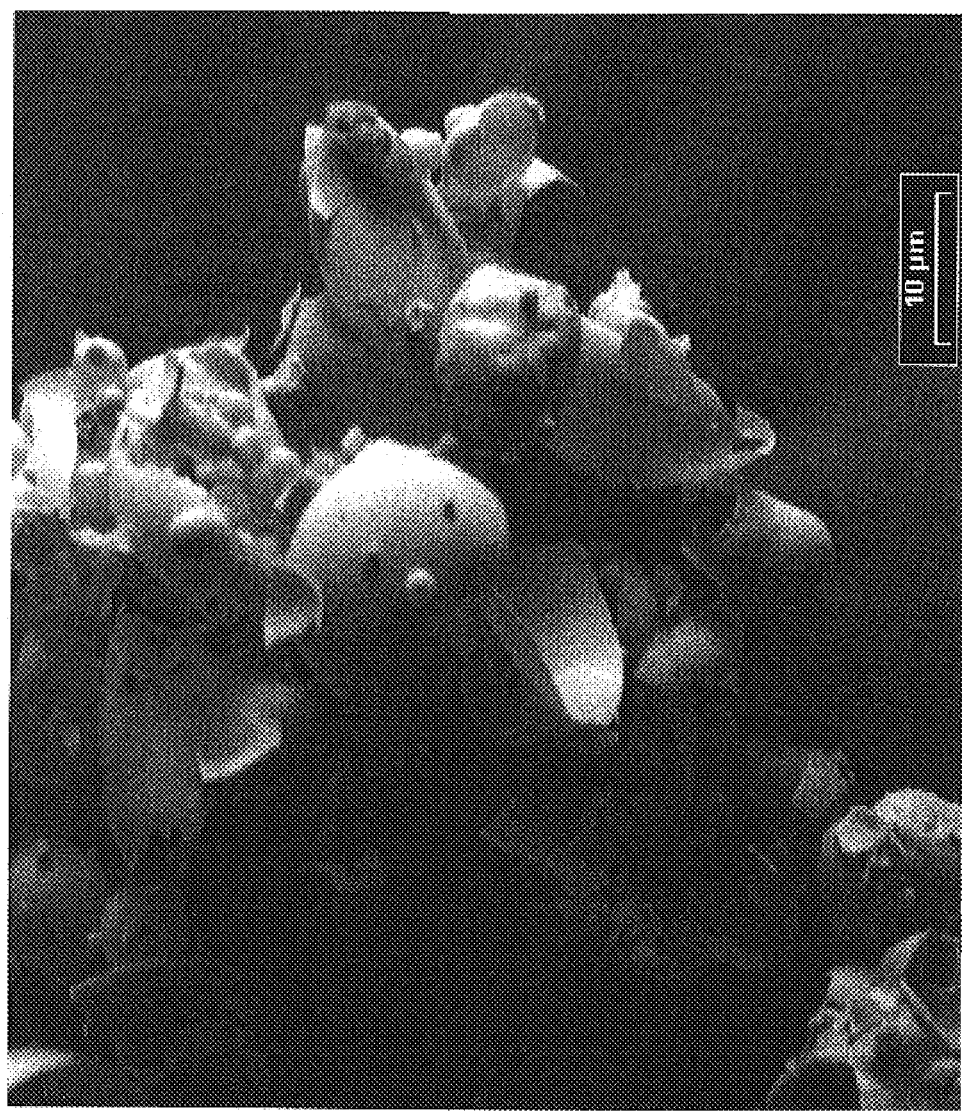
FIG. 5 is a scanning electron micrograph of the intermediate product after the substantially total evaporation step used in the process according to the present invention where the final product is an yttrium-stabilized zirconium oxide.
Figure 6:
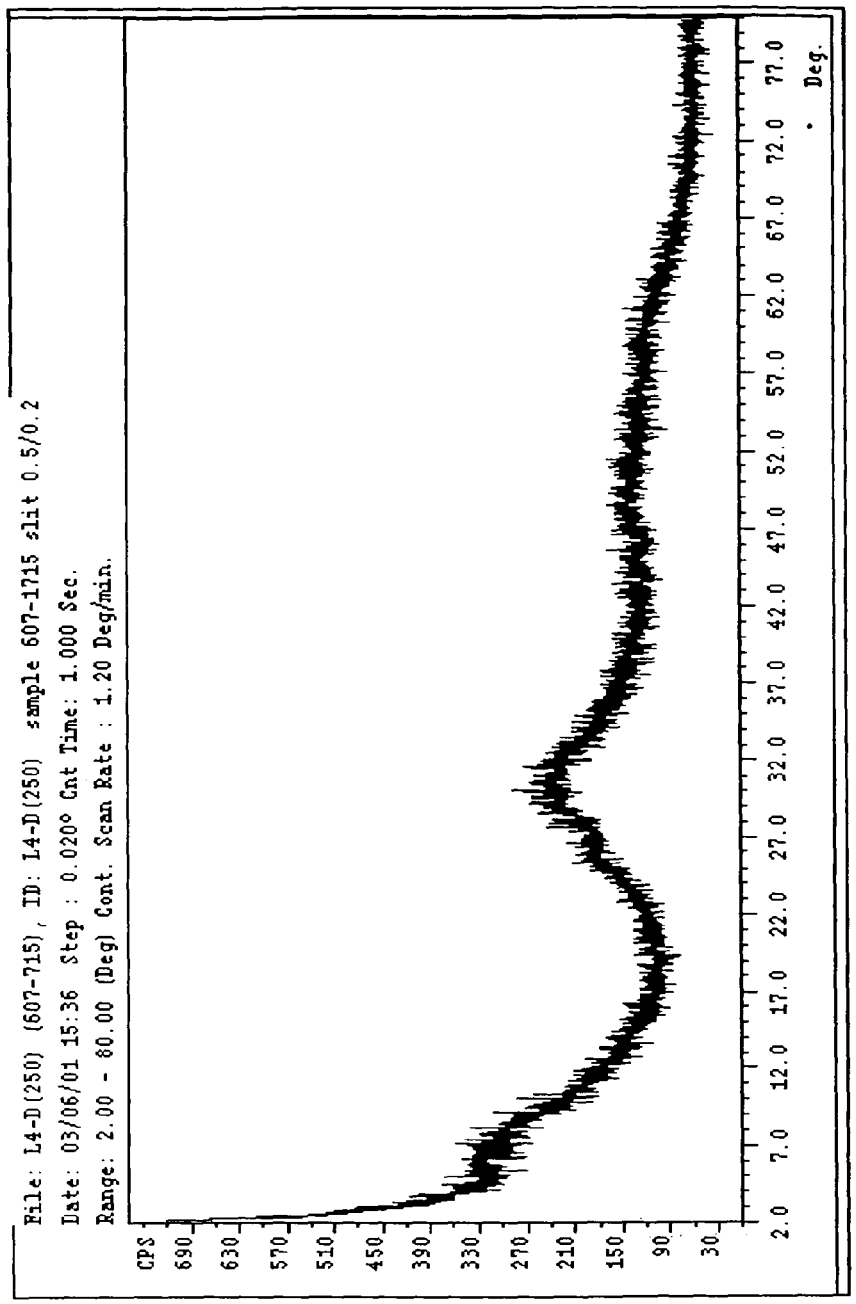
FIG. 6 is the X-ray diffraction pattern corresponding to the product of FIG. 5.

The intermediate product resulting from spraying in a spray dryer will be composed of thin-filmed spheres or parts of spheres. The dimensions of the spheres may vary over a wide range, from less than 1 μm to 100 μm in diameter, and the shell thickness in the range from about 30 nm to about 1000 nm. As an example, FIG. 5 is a scanning electron micrograph of the intermediate product after the substantially total evaporation step used in the process according to the present invention where the final product is an yttrium-stabilized zirconium oxide and where the evaporation was conducted by spraying. FIG. 6 is the X-ray diffraction pattern corresponding to the product depicted in FIG. 5. The X-ray diffraction pattern shows small crystals and only very partial crystallization. This intermediate product may be called amorphous.

The product of the evaporation process (the intermediate product) is further calcined to form an intimate mixture of oxide crystals, to convert the metal salt or salts to metal oxides. The calcination process may produce a chemical compound formed by reaction of the individual oxides of the metals in solution. Alternatively, the oxides of the metal in solution may remain present as an intimate physical mixture. It is also possible that only a part of the oxides reacts chemically, whereas another part will form an intimate physical mixture. The calcination temperature varies with the nature of the metals and salts used in the reactor, but is generally in the range 500° to 1300° C. The calcination time varies from about 2 hours to about 24 h.

If non-oxidized salts are present in the intermediate, an oxidizing agent is preferably added during the calcination process to convert any remaining metal salts to the metal oxide products of the present invention. The oxidizing agent may be air, air enriched oxygen, or pure oxygen, which is brought into contact with the metal salt or salts during calcinations. The oxidizing agent may also be a salt of an oxidizing agent such as nitric acid or perchloric acid.

The product of the calcination process is a chemically homogeneous structure, consisting of independent particles with a narrow size distribution. The size of the individual particles depends on the nature of the metal salts present, on the conditions of the evaporation process, and on the temperature and other conditions of calcination. The particles are bound together into a thin film. It is possible to adjust the conditions to produce individual particles of less than 100 nm, known as nano-sized particles. If the evaporation process is conducted by spraying, the structure binding the particles consists of spheres or parts of spheres.

If a fine powder is desired, the product can be milled and dispersed to break up the thin film into individual particles with narrow size distribution. Alternatively, the structure of bound particles formed after calcination may be used as final product. This structure typically exhibits a large and controllable surface area, and is typically a good material for use as a catalyst.

Without being bound by any theory, it is believed that evaporation of the solution under the conditions of this invention produces a highly homogeneous mixture of salts or oxides. Further calcination transforms the remaining salts into oxides and eliminates remaining anions (sulfate, nitrate, chloride etc.) by decomposition of the salt and formation of a gaseous compound ($HCl$, $SO_2$, $NO_2$ etc.). The final product is a homogeneous porous crystal structure, with large surface area and potentially high catalytic activity.

Particularly in the case where the feed solution consists of a mixture of a salt that hydrolyzes at the temperature of evaporation and one or more salts that are stable at the temperature of evaporation, it is believed that the formation of an amorphous oxide mixed with a salt phase, followed by decomposition of the salt in the calcining step, and possibly reaction with the oxide to form a mixed oxide compound, produces a porous structure with special properties. This porous structure may be used as such, for instance as a catalyst. It may also be milled or dispersed into individual particles with a narrow size distribution.

The following examples illustrate, but do not limit, the present invention.

EXAMPLE I

Copper Aluminum Oxide

The feed solution may be an aqueous solution that includes a water-soluble copper salt and a water-soluble aluminum salt containing amounts of Cu and Al in the same ratio as the desired ratio of copper to aluminum in the product oxide. The feed solution may be processed according to the steps of the present invention to produce a copper aluminum oxide.

Stabilized Zirconia

Stabilized zirconia consists of zirconium oxide to which a stabilizing agent has been added to stabilize the cubic structure over a wide temperature range.

The feed solution may contain a zirconium salt and a stabilizing agent. The zirconium salt will preferably include a zirconium salt selected from the group consisting of zirconium sulfate, zirconium oxychloride, zirconium oxynitrate, zirconium carbonate or another water or acid soluble zirconium salt. The stabilizing agent will be selected from the group consisting of calcium oxide, magnesium oxide, yttrium oxide or another rare earth oxide. When, for example, the zirconium salt is zirconium oxychloride and the stabilizing agent is added as yttrium chloride, zirconium oxychloride hydrolyzes into $ZrO_2$ while the solution is evaporated. The second salt remains as a chloride at the temperature of the process and is intimately mixed with $ZrO_2$. Calcination at 600° to 1300° C. creates a porous structure of stabilized zirconia.

Aluminum-titanium Oxide

The starting solution may be formed of titanium oxychloride and aluminum chloride. Both titanium oxychloride and aluminum chloride hydrolyze during the evaporation. The subsequent calcining step produces a structure of nano-sized individual aluminum-titanium oxide particles.

Lithium-titanium Oxide or Lithium Titanate

A solution of lithium chloride and titanium oxychloride with a Li to Ti ratio close to the stoichiometric formula $Li_4Ti_5O_{12}$ may be evaporated using the conditions of the invention, hydrolyzing the titanium oxychloride but leaving the lithium as a salt. Calcination at about 800° C. produces a structure of pure $Li_4Ti_5O_{12}$ that provides electrodes for lithium ion batteries with high intercalation capacity and high charging and discharging rates. Lithium chloride oxidizes during calcination and an oxidizing agent is provided during the process.

EXAMPLE II

An aqueous feed solution of copper sulfate (78 g/l Cu) and aluminum chloride (53 g/l Al) was prepared and evaporated. The evaporation was conducted by spraying the feed solution into a spray dryer at a temperature of 400° C., which is a temperature higher than the boiling point of the feed solution but lower than the temperature when significant crystal growth occurs. X-Ray diffraction analysis of the solid powder showed that the aluminum was present as the oxide, while the copper was present mostly as copper sulfate.

Figure 3:
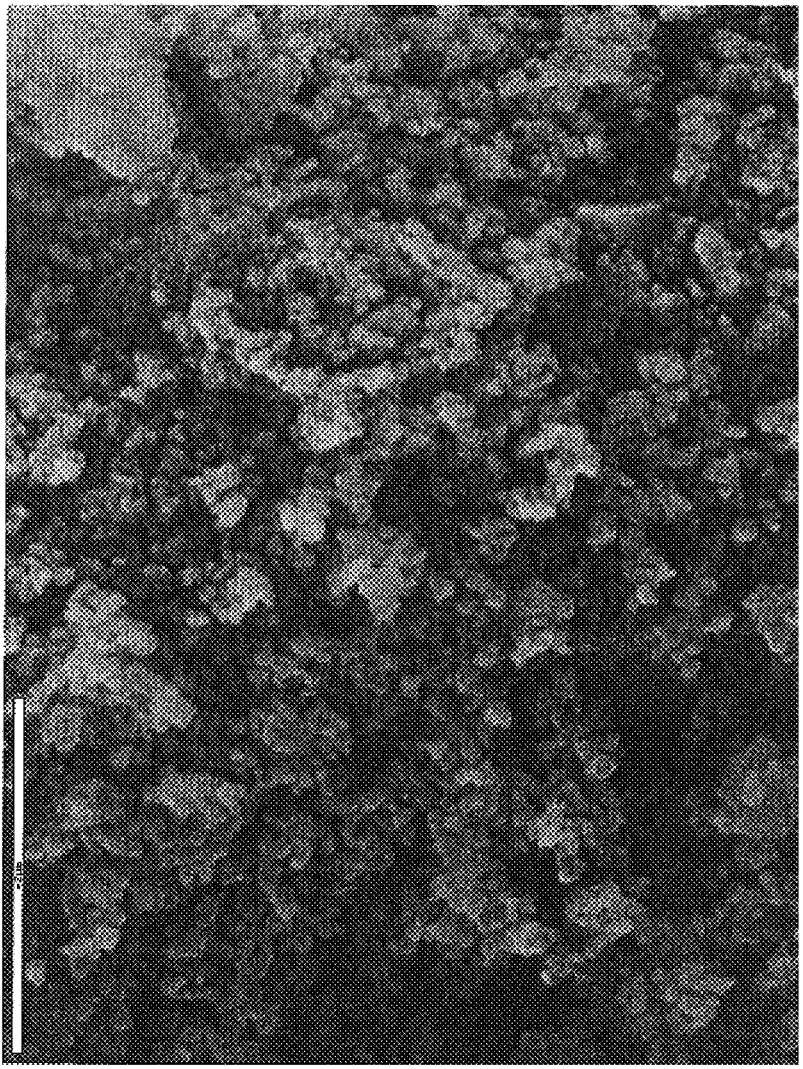
FIG. 3 is a scanning electron micrograph at a magnification of 30,000× of a copper aluminum oxide made using the process of the present invention.
Figure 4:
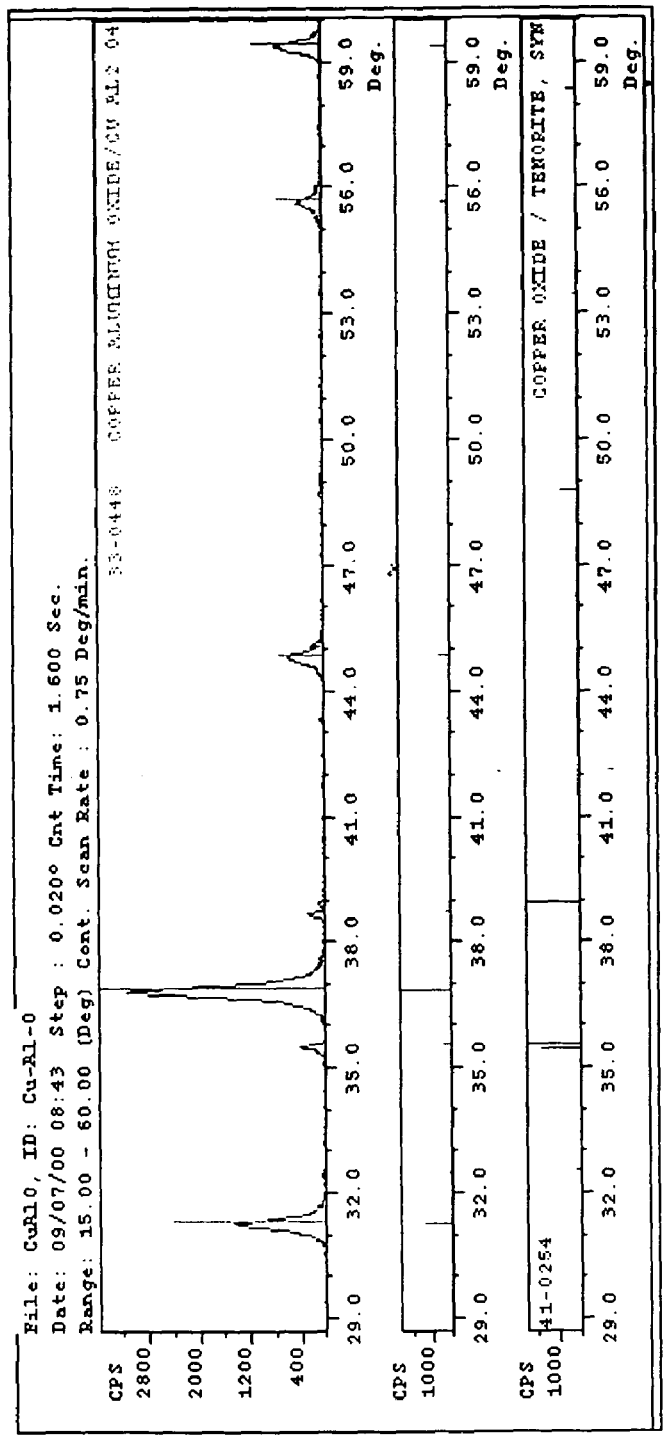
FIG. 4 is the X-ray diffraction pattern corresponding to the product of FIG. 3.

The resulting intermediate product was further calcined at 800° C. for 8 h. FIG. 3 is a scanning electron micrograph of the product after calcination at a magnification of 30,000×. It shows the two components are intimately mixed and that two separate phases cannot be distinguished at the scale of the micrograph. FIG. 4 is the X-Ray diffraction pattern of the calcined product and it shows that the crystals consist of $CuO.Al_2O_3$, with a minor amount of independent CuO crystals. The surface area, measured by the BET method, was 25 $m^2/g$. The size of individual crystals is of the order of 40 to 50 nm.

EXAMPLE III

Yttrium oxide ($Y_2O_3$) in an amount of 496 g was dissolved in 1.5 liter of concentrated HCl and diluted to 3 liter with water. Zirconium tetrachloride ($ZrCl_4$) in an amount of 5358 g was slowly added to the cooled solution. After addition of $ZrCl_4$, the yttrium chloride solution was mixed and the entire volume was diluted to 53 liters with water to form a feed solution.

The feed solution was evaporated by injecting it at a rate of 0.2 liters/min at the top of a titanium spray dryer with air injection at 500° C. and an outlet temperature of 250° C. The intermediate was recovered in a titanium cyclone. FIG. 5 is a scanning electron micrograph of the intermediate and FIG. 6 is the X-ray diffraction pattern of the intermediate and it shows that the intermediate is in the amorphous state.

Figure 7:
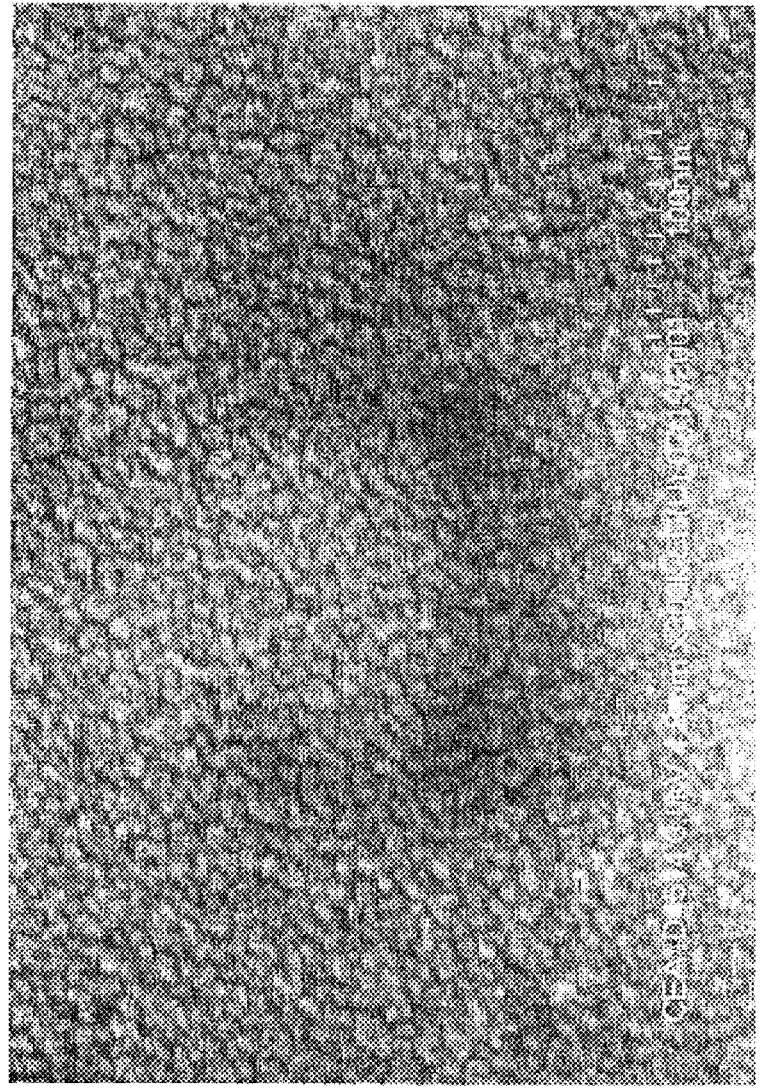
FIG. 7 is a scanning electron micrograph of the yttrium-stabilized zirconium oxide product manufactured according to the process of the present invention.
Figure 8:
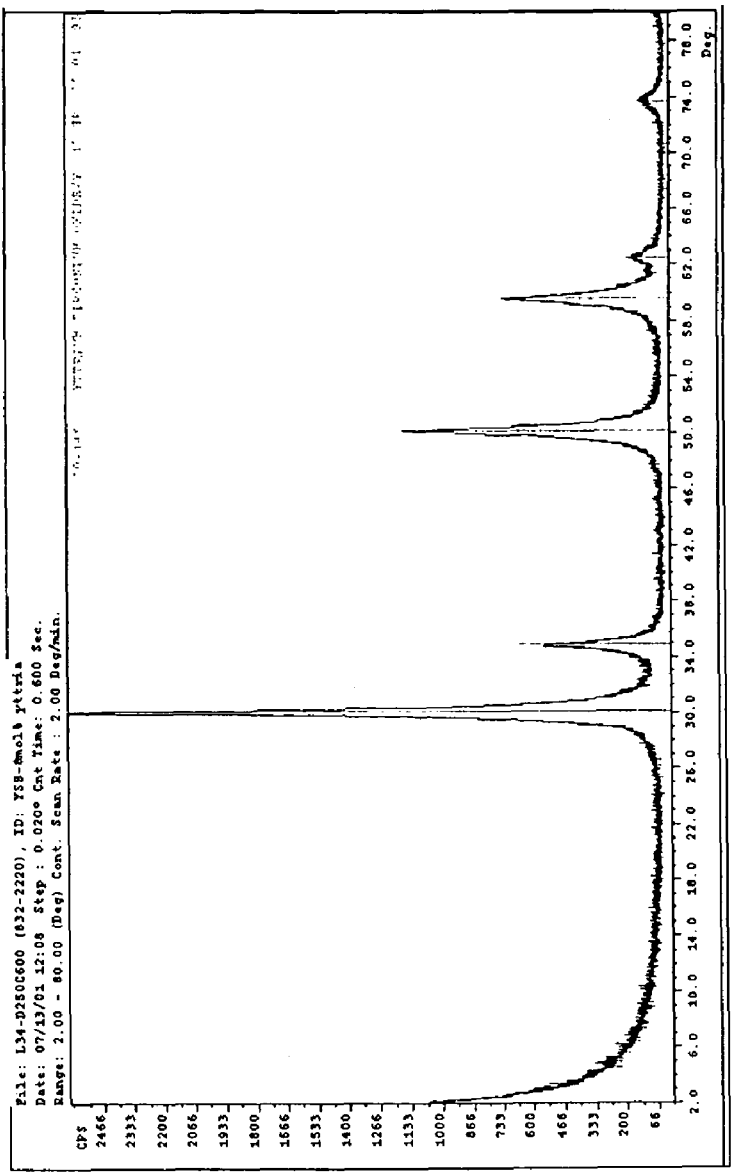
FIG. 8 is the X-ray diffraction pattern corresponding to the product of FIG. 7.

The intermediate product formed from the evaporation was placed in a silica roasting dish and calcined in a muffle furnace at 600° C. for 8 h. FIG. 7 shows a scanning electron micrograph of the calcined product. The particles are about 15 nm to in size and form a regular pattern that can be broken up by milling. FIG. 8 shows the X-Ray diffraction pattern corresponding to this product. It identifies the product as consisting mainly of yttrium zirconium oxide. The particle size estimated by the Scherrer method is 16 nm. The standard deviation on the size of the particles is estimated at less than 20%.

EXAMPLE IV

Yttrium oxide ($Y_2O_3$) in an amount of 460 g was dissolved in 1000 ml of concentrated HCl and diluted to 3000 ml with water. A volume of 10 liters of concentrated hydrochloric acid (12.1 M) was added to 18 liters of water and allowed to cool. A volume of 500 ml of an acid titanium oxychloride solution containing 130 g/l Ti and 410 g/l Cl was added to the cooled acid solution. The yttrium chloride solution was then added to the mixture. A weight of 4996.5 grams of zirconium tetrachloride ($ZrCl_4$) was slowly added to the cooled solution containing hydrochloric acid, yttrium, and titanium. After addition of the $ZrCl_4$, the entire volume was diluted to 53 liters with water to form a feed solution.

The feed solution was evaporated by injecting it at a rate of 0.3 liters/min at the top of a titanium spray dryer with air injection at 630° C. and an outlet temperature of 250° C. The intermediate product formed from the evaporation was recovered in a titanium cyclone.

Figure 9:
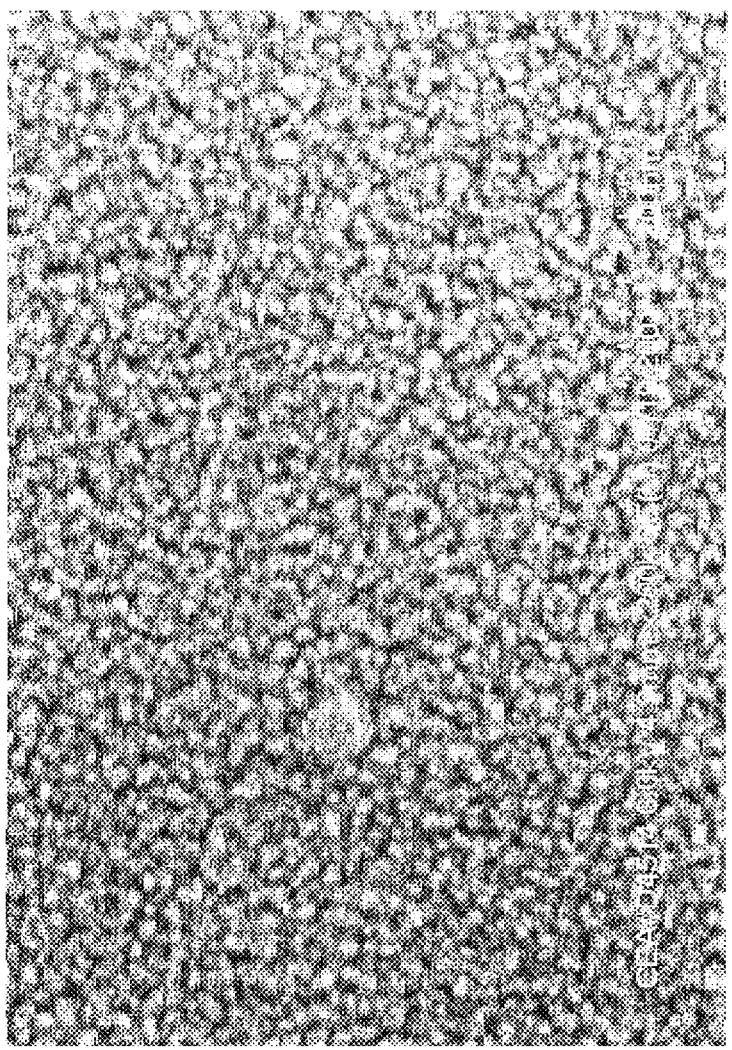
FIG. 9 is a scanning electron micrograph of zirconium-titanium-yttrium oxide manufactured according to the process of the invention.

This intermediate product formed from the evaporation was calcined at 600° C. for 8 h. FIG. 9 shows a scanning electron micrograph of the product after calcination. The picture shows a regular pattern, with elemental particles of about 15 nm in size and a narrow size distribution with a standard deviation of about 20%.

EXAMPLE V

A feed solution of titanium oxychloride and aluminum chloride containing 71.8 g/l Ti and 26.97 g/l Al was evaporated drop by drop on a hot plate at 500° C. to form an intermediate.

Figure 10:
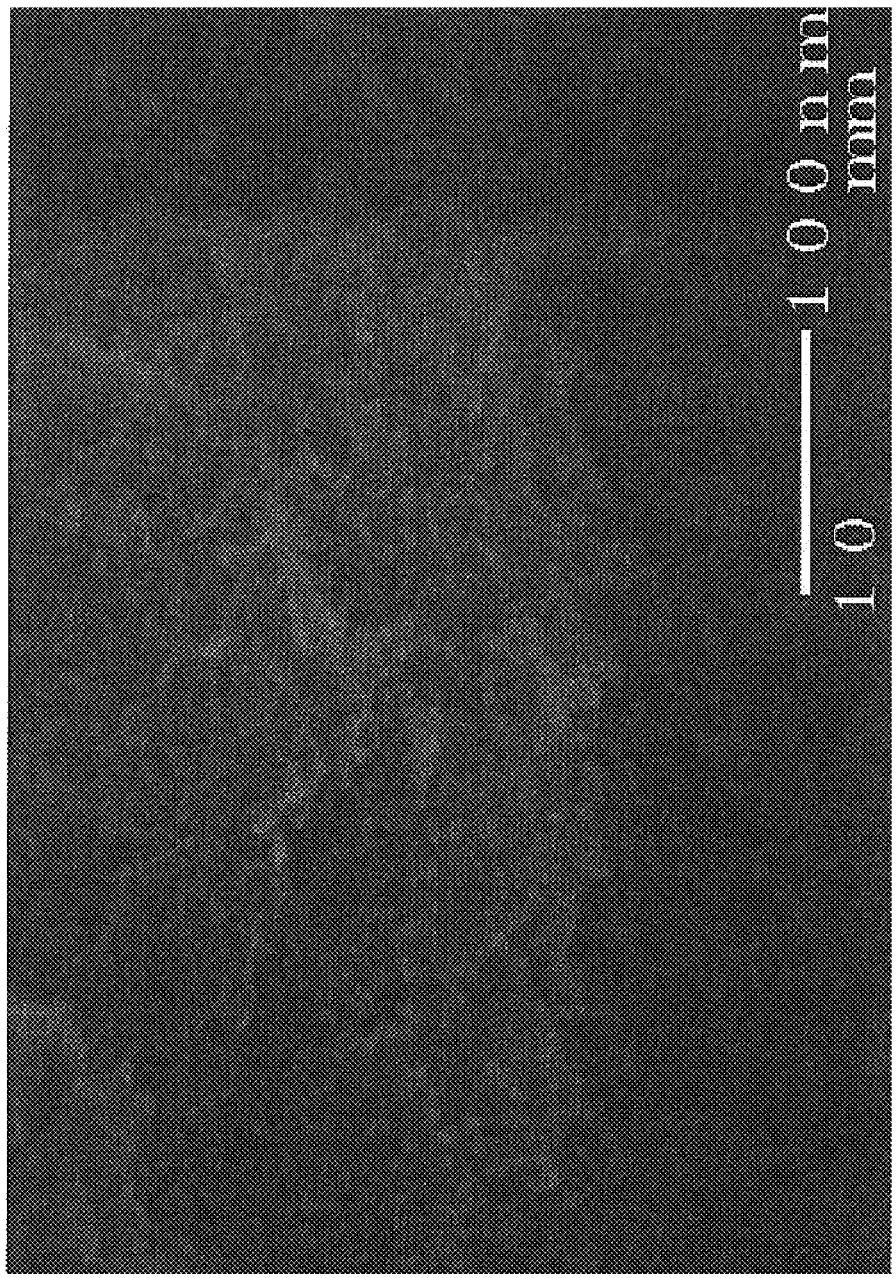
FIG. 10 is a scanning electron micrograph or an aluminum-titanium oxide product manufactured according to the process of the present invention.
Figure 11:
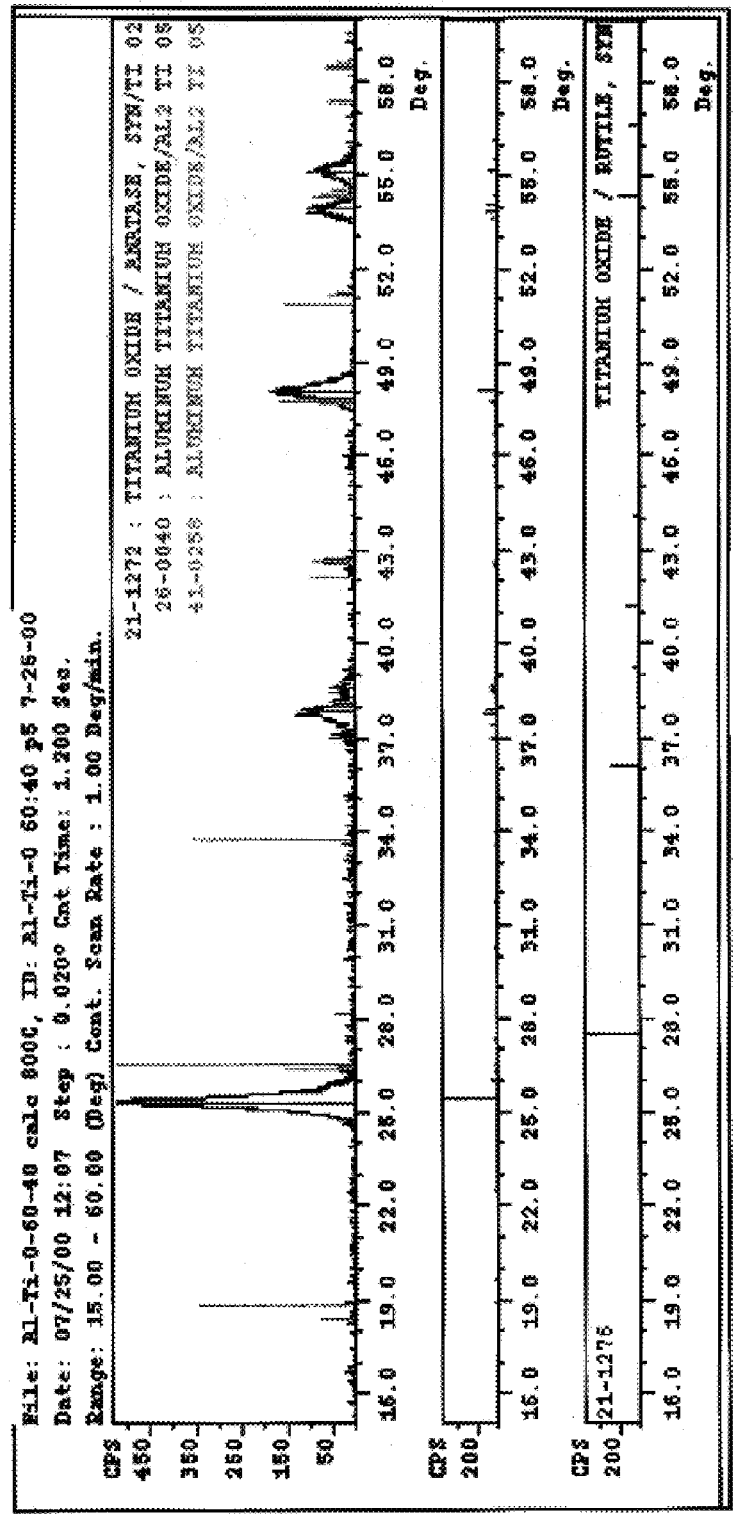
FIG. 11 is the X-ray diffraction pattern corresponding to the product of FIG. 10.

FIG. 10 is a scanning electron micrograph of the intermediate product after calcination, suggesting a particle size of the order of 10 nm. FIG. 11 is the X-ray diffraction pattern of the product. Mostly $Al_2O_3$ and $Al_2O_3.TiO_2$ compounds were detected by the x-ray diffraction. Peak intensities indicate very small particles.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A method of making a mixed metal oxide or a mixture of a metal oxide compound and a mixed metal oxide compound comprising:
   a. preparing an aqueous feed solution comprising from about 10 to about 200 g/l of a first metal salt having a cation selected from the group consisting of Ti, Zr, Hf, V, Nb, Ta, Cr, Mo, W, and mixtures thereof and from about 10 to about 200 g/l of a second metal salt having a cation selected from the group consisting of alkali metals, Mg, alkaline earth metals, lanthanoids, Y, and mixtures thereof;
   b. spray drying the feed solution at a temperature between about 100° C. to about 600° C. to form an intermediate product composed of one of thin-filmed spheres and parts of spheres; and
   c. calcining the intermediate at a temperature between 500° C. to 1300° C. to produce mixed metal oxides or metal oxide compounds.

2. The method of claim 1 wherein at least a portion of at least one metal in the mixed metal oxides or metal oxide compounds is present as the second metal salt.

3. The method of claim 1 wherein the anion of the first and second metal salts is selected from the group consisting of chloride, oxychloride, sulfate, oxysulfate, nitrate, nitrite, and mixtures thereof.

4. The method of claim 1 wherein the first metal salt is titanium salt, a zirconium salt, or a mixture of the two salts.

5. The process of claim 1 wherein the calcining step is conducted for a time between about 2 h and about 24 h.

6. The process of claim 1 wherein the intermediate consists of spheres or parts of spheres.

7. The process of claim 6 wherein the diameter of the spheres is between about 1 μm and about 100 μm.

8. The process of claim 6 wherein the thickness of the intermediate is in the range from about 30 nm to about 1000 nm.

9. The process of claim 4 wherein the second metal has a cation selected from the alkali metals.

* * * * *